Jan. 9, 1945.   R. H. BOUND   2,366,697
AIRCRAFT ALIGHTING GEAR
Filed Oct. 16, 1941

INVENTR
ROWLAND H. BOUND
BY Reynolds & Beach
ATTORNEYS

Patented Jan. 9, 1945

2,366,697

UNITED STATES PATENT OFFICE 2,366,697

AIRCRAFT ALIGHTING GEAR

Rowland Henry Bound, Cheltenham, England, assignor to Dowty Equipment Limited, Cheltenham, England Application October 16, 1941, Serial No. 415,320
In Great Britain October 24, 1940

6 Claims. (Cl. 244—104)

This invention is an aircraft landing element mounting which permits steering or castoring of the landing element and which employs shimmy damping means to resist and thereby damp out small rapid angular displacements of the landing element.

It is an object of the present invention to provide a compact and satisfactory arrangement of shimmy damping means for an oleo-pneumatic shock-absorber strut which shimmy damping means utilises the fluid enclosed within the strut to provide the resilient resistance required for landing and taxiing loads.

It is a further object of the present invention to provide satisfactory damping means which in operation interfere neither with the normal resilient characteristics of the strut nor with any self-centering means such as are generally provided in steerable or castorable aircraft landing element mountings.

The invention has a particular embodiment in an auxiliary landing element mounting such as that for a tail landing element or the nose or rear landing element of a tricycle undercarriage.

The invention will now be described with reference to the accompanying diagrammatic drawing, in which.

Figure 1:
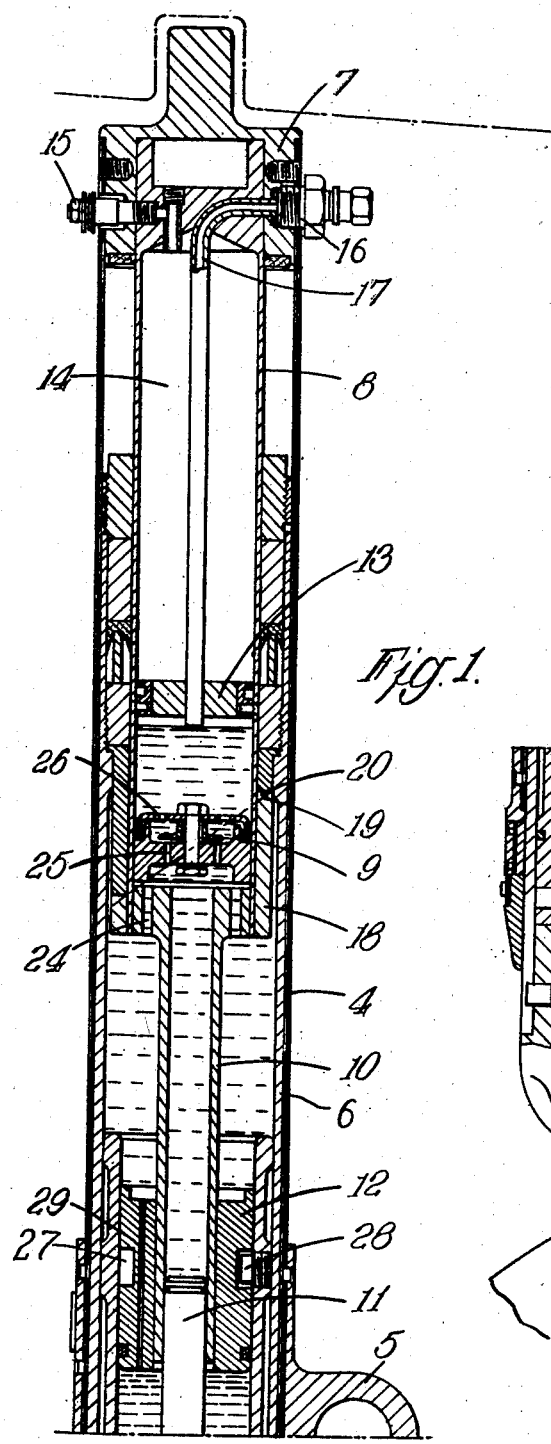
Figure 1 is a sectional side elevation of the upper portion of an oleo-pneumatic tail wheel mounting.
Figure 2:
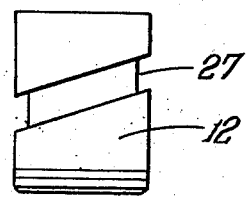
Figure 2 is a side elevation of the shimmy damping piston incorporated in the mounting.

Referring now to the drawing, the oleo-pneumatic tail wheel mounting illustrated embodies an outer strut part 4 which is non-yielding under landing and taxiing loads, but which is preferably mounted to swing for retraction purposes about the axis of the lug fitting 5, retraction being effected by means of a remotely controllable jack (not shown). The non-yielding sleeve part 4 receives internally the yielding and rotatable sleeve part 6. At its upper end the sleeve part 4 is plugged, as indicated at 7. From the end plug 7 there extends coaxially an internal fixed sleeve part 8, which is ported to provide restricted passage for fluid flow, as will later be apparent. The port arrangements, in accordance with the usual procedure for damping oleo-pneumatic struts, include a clack valve 9, the arrangement of which is such as to provide differential damping effect in accordance with the direction of travel. The coaxially extending reduced extension 10 of the sleeve 8 is open at its lower end and receives the locating pin 11 extending up from the rotatable part 6 of the mounting, the projection 10 being squared or splined for the reception of the shimmy damping piston 12. An idle piston 13 is provided internally of the upper fixed sleeve part 8 to define between the end closure plug 7 and the idle piston 13 the air chamber 14 to which air or gas at pressure is introduced through the inflation valve 15. The lower part of the strut beyond the idle piston 13 is filled with liquid introduced through the oil filler plug 16 and pipe 17, the function of the idle piston 13 being merely to keep the oil and gas separated, but it is not an essential element.

Fixed on the internal fixed sleeve part 8 is a sleeve 18 defining an edge cam 19 co-operating with an edge cam 20 carried by the yieldable and rotatable sleeve part 6. The arrangement of the cams is such that when there is no load on the mounting the edge cams 19 and 20 are in engagement due to the fact that gas pressure tends to extend the strut. The edge cams 19 and 20 are so devised that they align the landing element 21 in a fore-and-aft position, it being understood that the landing element 21 is carried by the plug 22 extending from the bracket 23 fixed within the yieldable and rotatable sleeve part 6. On the other hand when the strut is supporting the aircraft, gas in the chamber 14 is compressed, liquid having been forced through the ports 24, 25 and 26 as the sleeve part 6 yields with respect to the outer sleeve part 4 and in consequence of the relative movement between the fixed and yieldable sleeve parts the edge cam 20 separates from the edge cam 19 with the result that the landing element is completely free to castor at all times when it is supporting the aircraft on the ground.

For shimmy damping the shimmy damping piston 12 slides on the squared extension 10 and is provided with a sinuous cam slot 27 which is engaged by the roller 28 extending into it from the yieldable and rotatable sleeve part 6. The shimmy damping piston 12 has a damping part 29 extending right through it and it will be realised that due to the interengagement of the roller 28 with the cam slot 27, small and rapid angular movements of the landing element resulting from shimmy are translated into reciprocation of the damping piston 12, which movement is effectively damped by the restricted passage for fluid through the port 29.

Figure 3:
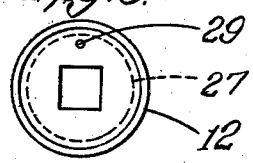
Figure 3 is a plan view corresponding to Figure 2.
Figure 1A:
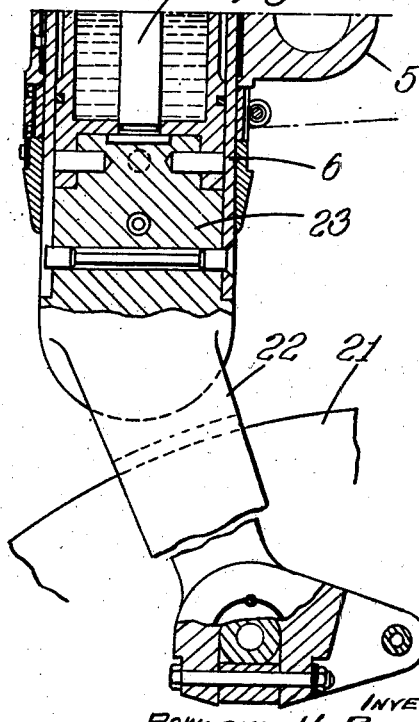
Fig. 1a is a similar view of the lower portion of the mounting.

In some cases springs may be loaded on either side of the shimmy damping piston, in which event it may be displaced axially purely against resilience, or against both resilience and resistance, the former due to the springs and the latter to the passage of liquid through a damping port such as that indicated in Figure 3 by the reference numeral 29. Similarly the upper part of the internal fixed sleeve 8 may comprise a spring chamber instead of having to rely on a gaseous medium as the means for providing the resilience required to landing and taxiing loads.

What I claim is:

1. In a mounting for an aircraft landing element, a strut part for connection to the aircraft, a strut part to mount a landing element assembled with said first strut part for rotation relative thereto about an axis extending lengthwise of the strut, and said strut parts being relatively yieldable axially against resilient resistance under landing and taxying loads, a damping piston, means interengaged between said damping piston and said first strut part restraining relative rotation thereof but guiding said piston and first strut part for unrestrained relative axial reciprocation during relative axial movement of said strut parts effected by landing and taxying loads, and cam means interengaged between said damping piston and said second strut part, including a sinuous groove in one such element and a projection carried by the other element and received in said groove, for effecting relative axial movement of said second strut part and said damping piston against resistance by relative rotative displacement of said strut parts, whereby to tend to damp out landing element shimmy.

2. A mounting as set forth in claim 1, wherein the second strut part is hollow and contains liquid in which the damping piston is submerged, and the damping piston has therethrough a restricted aperture resisting liquid flow through it during relative axial movement of the damping piston and the second strut part.

3. An oleo-pneumatic strut for mounting an aircraft landing element, including a strut part for connection to the aircraft, a hollow strut part to mount a landing element assembled with said first strut part to define therewithin a closed space containing liquid and air, and rotatable relative to said first strut part about an axis lengthwise of the strut, said two strut parts being yieldable axially under landing and taxying loads against the resilient resistance of the oleo-pneumatic medium within such space, a non-rotatable shimmy damping piston received in said hollow strut part, submerged in the liquid therein, and having a restricted port therethrough communicating with the liquid at each end of said piston, means interengaged between said piston and said first strut part guiding the same for unrestrained relative reciprocation during relative axial movement of said strut parts effected by landing and taxying loads but restraining relative rotation thereof, and means interengaged between said piston and said hollow strut part for effecting axial movement of said piston relative to said cylindrical strut part, and thereby forcing it through the liquid therein, by relative rotation of said strut parts, whereby to tend to damp out small and rapid angular displacements of the landing element during taxying.

4. In a mounting for an aircraft landing element, a strut part for connection to the aircraft, a strut part to mount a landing element assembled with said first strut part for rotation relative thereto about an axis extending lengthwise of the strut, and said strut parts being relatively yieldable axially against resilient resistance under landing and taxying loads, a damping member freely slidable relative to one strut part during such relative axial movement of said parts effected by landing and taxying loads, and means interconnecting said damping member and the other strut part for effecting relative axial movement thereof against resistance by relative rotative movement of said strut parts.

5. In a mounting for an aircraft landing element, a strut part for connection to the aircraft, a strut part to mount a landing element assembled with said first strut part for rotation relative thereto about an axis extending lengthwise of the strut, and said strut parts being relatively yieldable axially against resilient resistance under landing and taxying loads, a damping piston, means interengaged between said damping piston and said first strut part restraining relative rotation thereof but guiding said piston and first strut part for unrestrained relative axial reciprocation during relative axial movement of said strut parts effected by landing and taxying loads, and means interengaged between said second strut part and said piston for effecting relative axial movement thereof against resistance by relative rotation of said piston and second strut part, whereby to tend to damp out landing element shimmy.

6. An oleo-pneumatic strut for mounting an aircraft landing element, including a hollow upper cylinder for connection to an aircraft, a hollow lower cylinder carrying a landing element and telescopically engaged with said upper cylinder for rotation and reciprocation relative thereto, said two cylinders cooperatively defining therewithin a space containing liquid and air, and means for damping relative rotation of said cylinders without offering resistance to relative reciprocation thereof, including a piston having a restricted orifice therethrough received in said lower cylinder and submerged in the liquid therein, means interconnecting said upper cylinder and said piston and guiding the same for unrestrained relative reciprocation during axial movement of said strut parts effected by landing and taxying loads but restraining relative rotation thereof, and means interengaged between said piston and said lower cylinder for effecting reciprocation of said piston relative to said lower cylinder, and thereby forcing it through the liquid therein, by relative rotation of said cylindrical parts, whereby to tend to damp out small and rapid angular displacements of the landing element during taxying.

ROWLAND HENRY BOUND.